United States Patent Office 2,895,291
Patented July 21, 1959

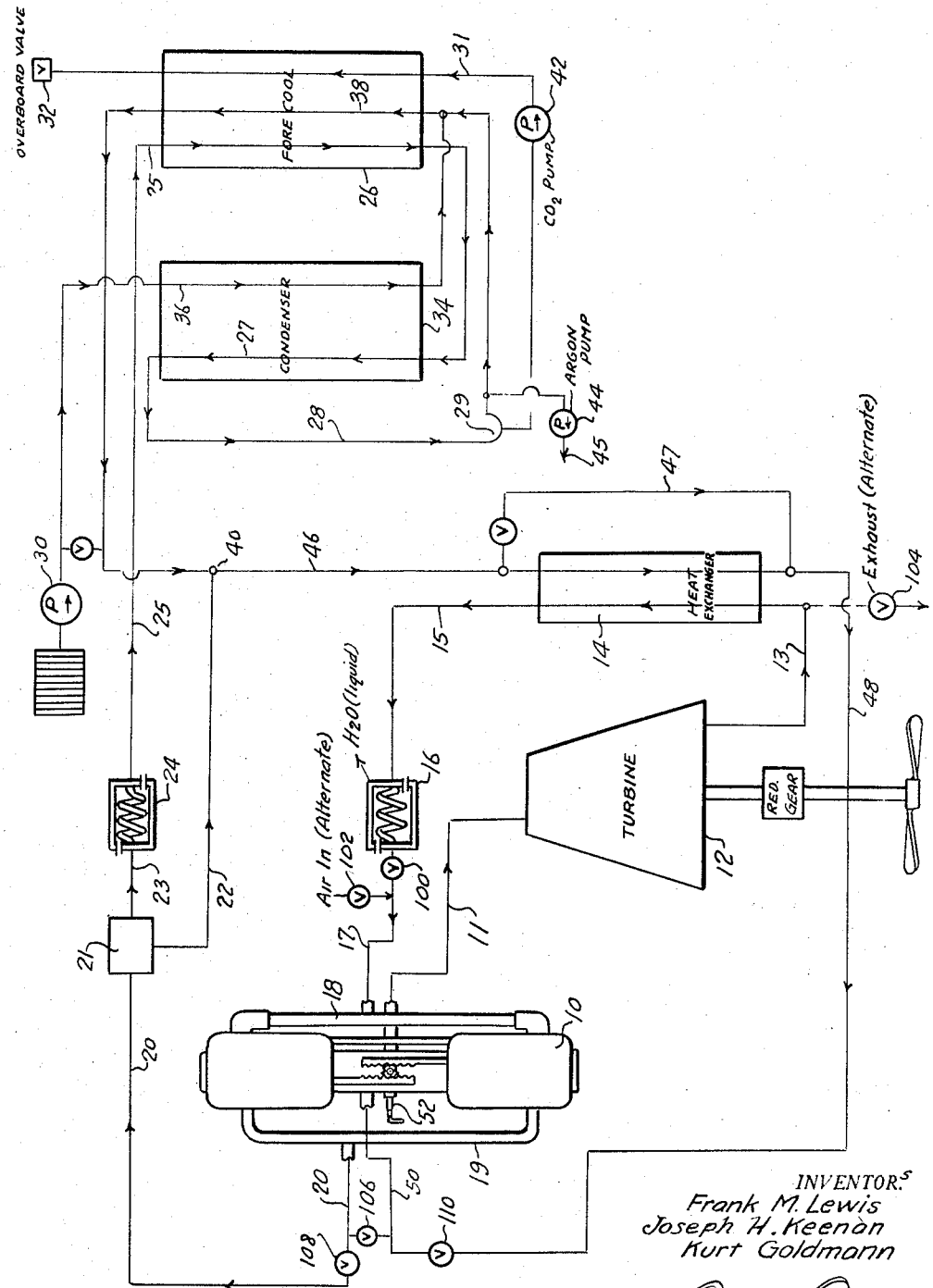

2,895,291

RECYCLING METHOD OF OPERATING FOR POWER PLANTS

Frank M. Lewis, Weston, and Joseph H. Keenan, Belmont, Mass., and Kurt Goldmann, Hamilton, Ohio, assignors, by mesne assignments, to Baldwin-Lima-Hamilton Corporation, a corporation of Pennsylvania Application December 2, 1948, Serial No. 63,162

3 Claims. (Cl. 60—13)

This invention relates to a closed cycle combustion method for power plants and is particularly directed to a method of maintaining the proper balance between the several constituents of the combustion gas to assure proper and efficient operation.

The primary object of the invention is to provide a closed cycle of operation for an internal combustion engine-turbine power plant in which the cycle efficiency is increased and a low specific oxygen consumption maintained.

Another object of the invention is to maintain the concentration of argon in the system at the optimum level by extracting only so much of the argon as exceeds such level.

Other objects and advantages of the invention will become apparent from the following description of a preferred embodiment, reference being had to the accompanying diagrammatic illustration of the components required successfully to operate a power plant on our closed cycle combustion system.

Referring to the diagram, the invention is shown in connection with a power system embodying a free piston power gas generator 10 exhausting into a line 11 which communicates with a turbine 12 which extracts energy from the gas and operates to supply power to any driven member. The free piston power gas generator is preferred as a source of gas at high temperature and pressure since it has a very high thermal efficiency and by utilizing a plurality of generators to supply a single turbine, lends itself to a compact, flexible and highly efficient plant. The turbine exhausts into a line 13 which passes into a regenerator 14, thence the gases go to a line 15 which in turn passes through a sea water cooler 16 where heat is extracted from the exhaust gases and a considerable amount of water vapor is condensed and removed. The gases passing from cooler 16 will thus be relatively low in water vapor and at a relatively low temperature. These gases pass through a line 17 to a compressor intake manifold 18 of the free piston unit. The gases are then compressed in the compressor cylinders of the free piston power gas generator and exhausted to manifold 19.

It will be appreciated that the gases, so compressed, contain products of combustion of the free piston power gas generator and varying amounts of residual oxygen. It is, therefore, necessary to replenish the oxygen supply and to remove unnecessary diluents before the gas can again be utilized in the power cylinder of the gas generator.

The compressed gases pass from manifold 19 through a line 20 to a three-way flow regulating device 21 which may be of any suitable form capable of diverting a portion of the gases to two outgoing lines designated 22 and 23. It will be apparent that a greater or less amount may be diverted to either of the lines to maintain proper concentration of the gaseous constituents as will be hereinafter apparent.

The gases in line 23 are passed into a sea water cooler 24 of known form where the temperature is lowered and a portion of the water vapor extracted therefrom. This gas, as is usually the case in combustion devices, contains a high concentration of carbon dioxide and also contains argon which originated as an impurity in the oxygen supply, in addition to the water vapor formed by combustion. Commercial liquid oxygen is approximately 99.7% pure and contains as much as 0.3% of argon, however, since a higher percentage of argon is desirable in our method of operation, oxygen of lower purity, and coincidently lower cost, can be used. It is desired to maintain the argon concentration at a relatively high value, as much as 20 percent, since argon is a heavy gas and therefore develops more power in a turbine of a given size and speed under the same pressure and temperature conditions than would a light gas. Further, the argon being monatomic, its adiabatic exponent is high so that the thermodynamic efficiency of a heat cycle embodying this gas is relatively great. For example, in a Brayton constant pressure cycle efficiency is calculated as:

$$E = 1 - \left(\frac{1}{Pr}\right)^{\frac{k-1}{k}}$$

The value of $k$ for argon is 1.67 while for diatomic gases such as nitrogen, oxygen, and carbon monoxide the value of $k$ is about 1.38 while the value of triatomic gases such as carbon dioxide and water is in the region of 1.25.

Gases from the cooler 24 thus contain largely carbon dioxide, argon and oxygen. These gases are taken through pipe 25 to a forecooler 26 where the temperature of the gaseous mixture is greatly reduced. The temperature of the forecooler is reduced by two means, first, by the passage of cold gases enriched by oxygen supplied by a pump 30 and secondly, by the passage of liquified carbon dioxide through pipe 31 from the carbon dioxide disposal pump 42. Oxygen from pump 30 passes initially through a condenser 34 in a line 36 and subsequently through the forecooler in line 38 to enter the system at point 40 in a junction with line 22 as will be presently described. The utilization of the latent heat of oxygen in this manner is disclosed and claimed specifically in a co-pending application of Frank M. Lewis, Serial No. 63,161, filed December 2, 1948, now U.S. Patent No. 2,884,912, granted May 5, 1959.

The gases in line 25 having been considerably reduced in temperature in the forecooler are further reduced in temperature in line 27 in the condenser 34 by the initial evaporation of compressed oxygen and argon from a suitable supply tank introduced by a pump 30. The degree of temperature reduction at this point is such that a large portion of the carbon dioxide is liquified but the argon, having a much lower boiling point, remains gaseous. The liquid thus formed passes through pipe 28 to trap 29 and carbon dioxide may be pumped therefrom by a pump 42 into line 31 which passes through the forecooler to a disposal valve 32. The gaseous argon passes through trap 29 and its concentration is adjusted at this point by pumping excess amounts as gas from the system via a separate pump 44 and the argon may be discharged through discharging line 45. Whatever gaseous constituents are not removed from the system are passed through pipe 38 and mixed with the oxygen from pipe 36 prior to entering the forecooler. The mixture at this point is at low temperature, adequate for use in the forecooler but too cold to be used in an engine.

At point 40 the oxygen enriched mixture from the forecooler is added to the heated gases from pipe 22 and passed through pipe 46 to the regenerator 14. The temperature of the mixture is raised somewhat, and the relative proportions between oxygen, argon and spent gas established for use in the combustion cycle. A by-pass 47 is provided so that gas may flow around the regenerator in the event that the intake temperature of the free piston gas generator is higher than desirable. From the regenerator 14 the oxygen enriched mixture passes through pipe 48 to the intake ports as at 50 of the power gas generator. Fuel in the form of oil or other hydrocarbon is supplied by the usual injector designated 52.

Since the carbon dioxide is extracted in the form of a liquid from trap 29, having been liquified in condenser 34, it can be discharged after passing through the forecooler to a surrounding body of water and absorbed therein without the formation of vapor or gas to cause bubbles in the water. Further, the power required to dispose of the liquid carbon dioxide by pump 42 is very low and the system is thus economical in this respect, more so than if gas were to be discharged into a surrounding body of water at high pressure.

If it is desired to operate the free piston power gas generator and turbine without recycling, air from the atmosphere may be taken into line 17 by closing valve 100 and opening a companion valve 102. Under these conditions line 13 is exhausted past valve 104 instead of passing through regenerator 14. In open cycle operation a bypass valve 106 is provided to admit compressed air from the compression cylinders of the free piston unit to line 50 from line 19. At this time passage from line 19 to line 20 is closed by valve 108. Line 48 will at this time be closed by valve 110. A change from open cycle to closed cycle operation can thus be accomplished in the time necessary to open and close a few valves. On the establishment of closed cycle operation the argon concentration will be low, but will build up as the operation progresses and more of the liquified oxygen consumed.

While the invention has been described in conjunction with a specific arrangement of the components, it should be expressly understood that the arrangement is illustrative only and that numerous modifications and changes may be made therein without departing from the spirit and scope of the appended claims.

What we claim is:

1. In a method of operating a power plant comprising an internal combustion engine and a turbine driven by the products of combustion of the engine, the steps which include passing the products of combustion through the turbine and expanding them therein, compressing the products of combustion after energy has been extracted therefrom in the turbine, dividing the compressed gas into two streams, reducing the temperature of one stream sufficiently to liquify carbon dioxide, removing liquified carbon dioxide from the system, adjusting the argon content of the stream to a predetermined maximum, adding a mixture of oxygen and argon to the cooled stream, reuniting the oxygen enriched stream with the other stream, and supplying the combined streams of gas as combustion supporting gas to the internal combustion engine.

2. A method in accordance with claim 1 in which the argon concentration is built up to at least 10% by volume of the combustion supporting gas.

3. The method in accordance with claim 1 in which the oxygen and argon are added from a source of compressed gases.

References Cited in the file of this patent

UNITED STATES PATENTS 2,017,481     Von Opel _____ Oct. 15, 1935